United States Patent
Berthon et al.

(10) Patent No.: US 7,162,336 B2
(45) Date of Patent: Jan. 9, 2007

(54) PROCESS AND SYSTEM FOR TRANSMITTING INFORMATION ON AN AIRCRAFT

(75) Inventors: Valérie Berthon, Colomiers (FR); Denys Bernard, Pelleport (FR); Yvan Fernandez-Ramos, Toulouse (FR)

(73) Assignee: Airbus France, Toulouse (FR)

( * ) Notice: Subject to any disclaimer, the term of this patent is extended or adjusted under 35 U.S.C. 154(b) by 283 days.

(21) Appl. No.: 10/852,488

(22) Filed: May 25, 2004

(65) Prior Publication Data

US 2005/0004720 A1 Jan. 6, 2005

(30) Foreign Application Priority Data

Jun. 4, 2003 (FR) .................................. 03 06734

(51) Int. Cl.
*G06F 7/00* (2006.01)
(52) U.S. Cl. ............................ 701/3; 701/28; 701/24; 244/1 R
(58) Field of Classification Search ................ 701/3, 701/29, 36, 24; 244/1 R
See application file for complete search history.

(56) References Cited

U.S. PATENT DOCUMENTS

| | | | |
|---|---|---|---|
| 5,768,528 A | | 6/1998 | Stumm |
| 6,401,013 B1 * | | 6/2002 | McElreath .................. 701/3 |
| 6,668,215 B1 * | | 12/2003 | Lafon et al. ................ 701/3 |
| 6,754,567 B1 * | | 6/2004 | Bernard .................... 701/3 |
| 6,801,769 B1 * | | 10/2004 | Royalty ................... 455/431 |
| 2002/0080171 A1 | | 6/2002 | Laferriere et al. |

FOREIGN PATENT DOCUMENTS

EP 0475581 A2 3/1992

OTHER PUBLICATIONS

R. McCartney, et al.; "An Arinc D-Size, Liquid Crystal Display For Aircraft Primary Flight Instruments," Digital Avionics Systems Conference, 1994, 13thDASC., AIAA/IEEE Phoenix, AZ, USA 30, Oct. 3-Nov. 199 New York, NY, USA, IEEE, Oct. 30, 1994, pp. 620-625, XP010127068, ISBN: 0-7803-2425-0.

R. Hamza, et al.; "Video To Information (V2I) System Enabling Old Commercial Cockpit Instruments To Participate In The Advanced Information Retrieval And Safety Services," 21th, DASC. The 21th, Digital Avionics CA, Oct. 27-31, 2002, Digital Avionics Systems Conference, New York, NY: IEEE, US, vol. 1 of 2, conf. 21, Oct. 27, 2002, XP010616254, ISBN: 0-7803-7367-7.

* cited by examiner

*Primary Examiner*—Thomas Black
*Assistant Examiner*—Marie A Weiskopf
(74) *Attorney, Agent, or Firm*—Stevens, Davis, Miller & Mosher, LLP

(57) ABSTRACT

The system (1) comprises at least one device (2) of avionics type, at least one interface means (3) available to an operator, information transmission means (4) capable of connecting together the device (2) and the interface means (3), a means (11) of avionics type for determining, in the form of at least one image, a representation of information to be transmitted from the device (2) to the interface means (3) and for transmitting this representation in the form of at least one image to the interface means (3) which is formed so as to display, on at least one display screen (13), the image corresponding to the representation of said information.

14 Claims, 2 Drawing Sheets

PROCESS AND SYSTEM FOR TRANSMITTING INFORMATION ON AN AIRCRAFT

FIELD OF THE INVENTION

The present invention relates to a process and a system for transmitting information on an aircraft.

BACKGROUND OF THE RELATED ART

It is known that most aircraft currently in service, in particular civil transport planes, are equipped with onboard electronic devices, in particular computers of so-called "avionics type". These electronic devices are used, in particular, for the aircraft's strategic flight functions such as the flight controls. These devices have, consequently, to exhibit a very high level of reliability, able to guarantee a failure rate of the aircraft that is lower than that demanded by the certifying authorities. The communication networks and the links between such onboard devices (computers) of avionics type must meet the same reliability demands.

Certain modern transport planes, such as planes of the "Airbus A340-600" and "Airbus A318" type for example, also comprise so-called "open world" onboard equipment, which is not specific to aeronautical applications. This "open world" equipment is interface means (of "man-machine" type) available to an operator, in particular a pilot, of the airplane. By way of nonlimiting example, mention may be made of so-called industrial processors, portable computers, printers, etc. Such "open world" equipment exhibits a lower level of reliability than that of the aforementioned devices of avionics type. It nevertheless has the advantage of being much cheaper than them and their reliability level is sufficient for applications that are not directly related to maneuvers of the plane, such as for example the consulting of maintenance documentation or diagnostic aid with regard to maintenance. When an airplane comprises interface means of open world type, it is sometimes beneficial to be able to use one or more of these interface means, to allow an operator to exchange information with devices of avionics type. This may be useful in particular within the framework of maintenance operations on the airplane, for consulting values of parameters available in devices of avionics type or for testing certain components of the airplane (for example electrical circuits, control surfaces, etc), the maneuvering of which is controlled by such devices of avionics type.

However, even if these maintenance operations exhibit lesser criticalness than that of the flight phases of the airplane, the reliability level of said interface means of open world type may not be sufficient in certain cases. Thus, by way of example, when a operation involves the maneuvering of a control surface, it is imperative for the latter not to trigger inadvertently, since inadvertent triggering could be dangerous for personnel located in proximity to said control surface. Likewise, when a maintenance operation entails the handling of electrical equipment, the operator must ensure that this equipment is not live, erroneous information possibly having fatal consequences.

Consequently, it is generally strongly discouraged, in particular for reliability and hence safety reasons, to implement transmission of sensitive information on an aircraft between a device of avionics type, such as described above, and an interface means of aforesaid type.

SUMMARY OF THE INVENTION

An object of the present invention is to remedy these drawbacks. It relates to a particularly reliable process for transmitting information on an aircraft, from a device of avionics type to an interface means (of "open world" type) which is available to an operator of said aircraft, said device and said interface means being capable of being connected together.

According to the invention, said process is noteworthy in that to transmit information from said device to said interface means:

a) a representation of said information to be transmitted, in the form of at least one image, is determined with the aid of a means of avionics type;
b) this representation in the form of at least one image is transmitted to said interface means; and
c) said interface means displays, on a display screen, said image corresponding to the representation of said information.

From the coding of an item of information in image form it follows that the latter is represented by means of a higher number of symbols (bits, bytes, etc), representing pixels of the image, than if this information item were represented directly in numerical or binary form. Thus, should there be an error during the transmission of this information, the probability that the information is not detected as being erroneous is much lower when this information is transmitted in image form than when it is transmitted in a more condensed form, for example numerical. Preferably, the image is sent according to a format of matrix or similar type, and not in a vector form that is more liable to be erroneous in a manner which is not detectable by the operator.

Thus, should there be an error affecting the image (this error possibly being due in particular to the transmission from the "avionics world" to the "open world", to the displaying of the image by the interface means, etc), either this error affects only a tiny part of the image (one or a few pixels for example) and it follows that the information remains comprehensible to the operator who can decide to consider this information to be valid, or the error affects a larger part of the image, or even the entire image, and in this case the operator does not consider the information to be valid. In the latter case, he can, for example, request the retransmission of the information.

It will be noted that the image of an item of information or of a message is formed by concatenating the elementary images of the characters constituting said item of information or said message. For example, the image of "ABCD", is constructed by juxtaposing the elementary images of "A", "B", "C" and "D".

In a first simplified embodiment, said means of avionics type which determines a representation of said information forms part of said device of avionics type.

Furthermore, in a second preferred embodiment, said device (of avionics type) forms part of a first network of devices of avionics type, said interface means forms part of a second network of interface means, and said means of avionics type which determines a representation of said information corresponds to an interface module provided between said first and second networks. This preferred embodiment has the advantage of centralizing into a single item of equipment (said interface module) the function of transforming information into the form of images representing this information, rather than duplicating this function in each of the various devices of avionics type of said first network.

Of course, advantageously, it is also possible to transmit at least one indication from said interface means to said device.

In a particular embodiment, an image displayed by the interface means comprises at least one sensitive zone that can be designated and validated by an operator with the aid of appropriate means, and, when a sensitive zone of an image is designated and validated, said interface means transmits to said device the co-ordinates of said sensitive zone on the image.

In this case, preferably, an image displayed by said interface means comprises a plurality of sensitive zones, and the sum of the areas of all of said sensitive zones is less than a predetermined percentage of the total area of said image displayed.

Furthermore, advantageously, when said device receives the co-ordinates of a first sensitive zone which has been designated and validated, it verifies the consistency of these co-ordinates and, if these co-ordinates are consistent, said device returns a new item of information, the corresponding image of which comprises a confirmation sensitive zone that must be designated and validated by an operator in order to confirm the initial designation and initial validation of said first sensitive zone.

In this case, preferably, said confirmation sensitive zone is provided alongside said first initially designated and validated sensitive zone.

The present invention relates to an information transmission system carried onboard an aircraft, said system comprising:
  at least one device of avionics type;
  at least one interface means available to an operator; and
  information transmission means capable of connecting together said device and said interface means.

According to the invention, said system is noteworthy in that it comprises a means of avionics type for determining, in the form of at least one image, a representation of information to be transmitted from said device to said interface means and for transmitting this representation in the form of at least one image to said interface means, and wherein said interface means is formed so as to display, on at least one display screen, said image corresponding to the representation of said information.

Furthermore, according to the invention:
  in a first embodiment, said means of avionics type forms part of said device; and
  in a second embodiment, said device forms part of a first network of (a plurality of) devices of avionics type, said interface means forms part of a second network of (a plurality of) interface means, and said means of avionics type corresponds to an interface module provided between said first and second networks.

Furthermore, advantageously:
  said system is formed so as to also allow the transmission at least of an indication from said interface means to Said device; and/or
  said interface means comprises at least one cursor control device which is designed in such a way as to be able to be actuated by an operator and which comprises at least:
    an actuatable designation means, capable of moving a cursor over an image displayed on the display screen in such a way as to designate a sensitive zone of said image by depicting a marker; and
    an actuatable validation means, capable of validating a sensitive zone which is furnished with said marker.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
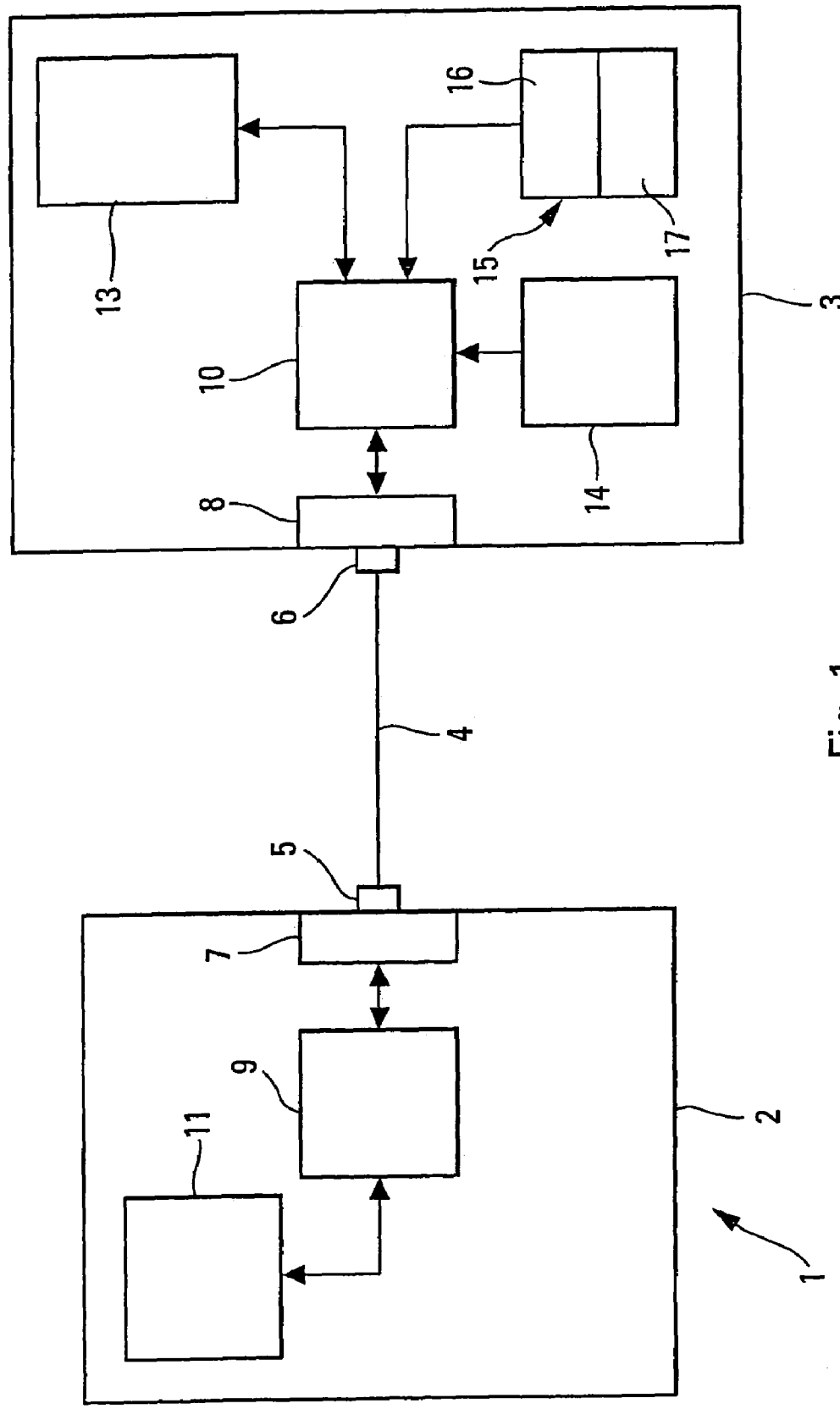
FIGS. 1 and 2 are the schematic diagrams of two different embodiments of an information transmission system in accordance with the invention.
Figure 2:
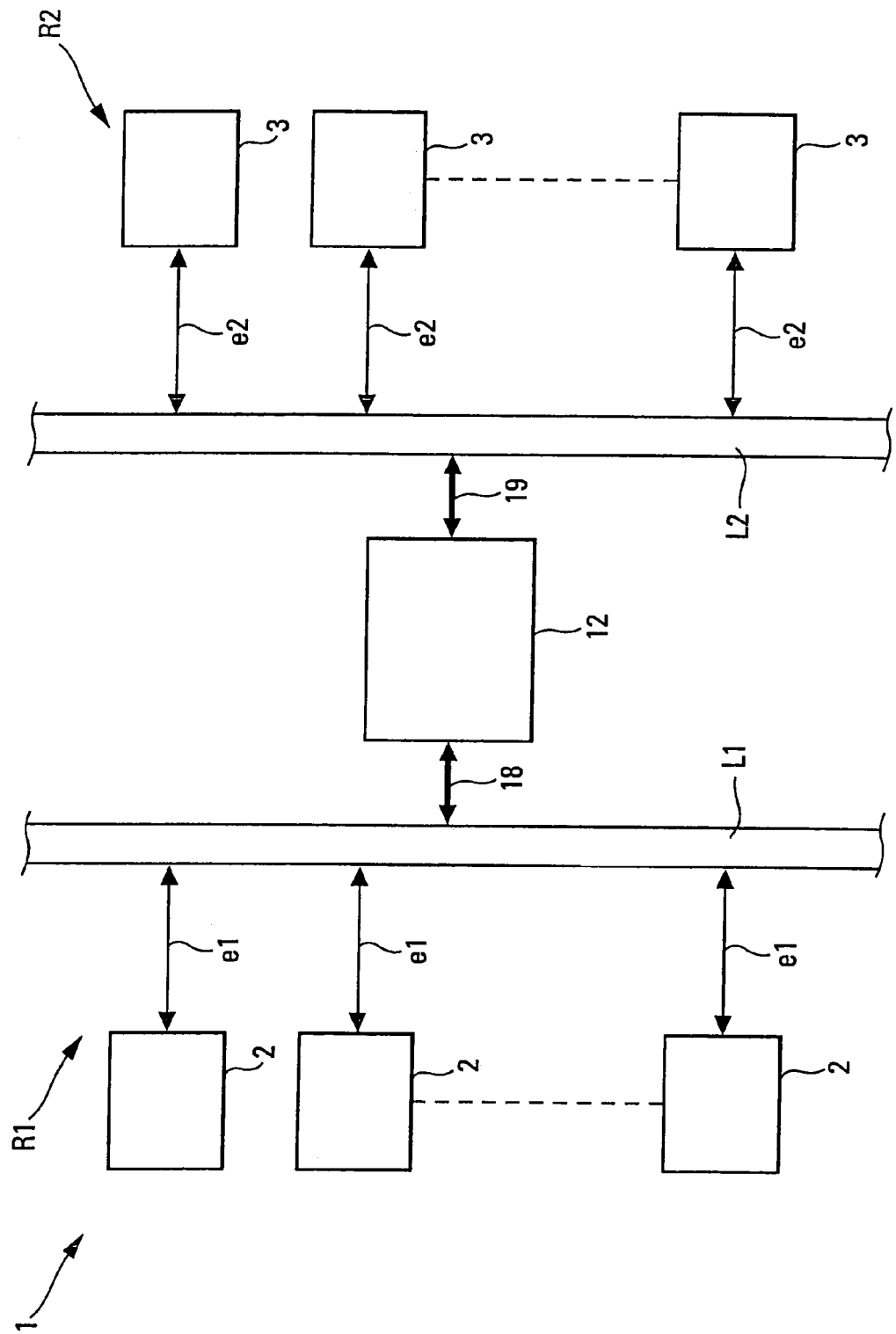

The system 1 in accordance with the invention and represented diagrammatically in FIGS. 1 and 2 is intended for the transmission of information on an aircraft (not represented), in particular a civil transport plane.

More precisely, said system 1 is of the type comprising, as represented in FIG. 1:
  at least one electronic device 2 of avionics type, in particular a computer, for example a flight control computer, which is mounted fixedly on the aircraft and which exhibits a very high reliability level, able to guarantee a failure rate of the aircraft that is lower than that demanded by the certifying authorities:
  at least one interface means 3, for example a portable computer, which is available to an operator of the aircraft, which is of "open world" type, which is also carried onboard the aircraft and which exhibits reduced reliability so as not to generally guarantee the failure rate demanded by the aircraft's certifying authorities;
  at least one information transmission link 4, of standard type, capable of being connected by standard means of connection 5 and 6 provided at its ends, respectively, to the device 2 and to the interface means 3, so as to connect these latter together and to allow the implementation of information transmission between them.

Moreover, said device 2 and said interface means 3 also comprise, each:
  a data acquisition means 7, 8; and
  a data processing unit 9, 10 which is connected to said data acquisition means 7, 8.

The object of the system 1 is, in particular, to allow the transmission of information from the device 2 to the interface means 3.

To do this, according to the invention, said system 1 comprises a means 11, 12 of avionics type (that is to say a means 11, 12 which exhibits a very high level of reliability so as to guarantee the failure rate demanded by the aircraft's certifying authorities) for determining, in the form of at least one image, a representation of an information item to be transmitted from said device 2 to said interface means 3 and for transmitting this representation in the form of at least one image to said interface means 3, and said interface means 3 is formed so as to display, on at least one display screen 13, said image corresponding to the representation of said information item.

From the coding of an item of information in image form it follows that the latter is represented by means of a higher number of symbols (bits, bytes, etc.), representing pixels of the image, than if this information item were represented directly in numerical or binary form. Thus, should there be an error during the transmission of this information, the probability that the information is not detected as being erroneous is much lower when this information is transmitted in image form than when it is transmitted in a more condensed form, for example numerical. Preferably, the image is sent according to a format of matrix or similar type, and not in a vector form that is more liable to be erroneous in a manner which is not detectable by the operator.

Thus, should there be an error affecting the image (this error possibly being due in particular to the transmission from the "avionics world" to the "open world", to the displaying of the image by the interface means 3, etc.), either this error affects only a tiny part of the image (one or a few pixels for example) and it follows that the information remains comprehensible to the operator who can decide to consider this information to be valid, or the error affects a larger part of the image, or even the entire image, and in this case the operator does not consider the information to be valid. In the latter case, he can, for example, request the retransmission of the information, with the aid of an appropriate means of actuation 14, for example a, keypad, of the interface means 3.

In a particular embodiment represented in FIG. 1, the representation of an item of information in the form of an image is generated directly by the device 2 of avionics type, with the aid of said means 11 which is integrated into said device 2 and which is therefore also of avionics type.

Of course, within the framework of the present invention, it is also possible to transmit at least one indication from said interface means 3 to said device 2, for example with the aid of of said means of actuation 14.

In a particular embodiment, an image which is displayed by the interface means 3 on the display screen 13 comprises at least one sensitive zone that can be designated and validated by an operator with the aid of appropriate means 15, specified below, and, when a sensitive zone of an image is designated and validated, said interface means 3 transmits to said device 2 the co-ordinates of said sensitive zone on the image.

Said appropriate means 15 comprise a cursor control device 15, for example a computer mouse or a trackball, which is designed in such a way as to be able to be actuated by an operator and which comprises at least:
- an actuatable designation means 16, capable of moving a cursor over an image displayed on the display screen 13 in such a way as to designate a sensitive zone of said image by depicting a marker or "focus", that is to say by marking or by emphasizing this sensitive zone, in particular through a change of appearance such as a change of color or a highlighting for example; and
- an actuatable validation means 17, capable of validating a sensitive zone which is furnished with said marker.

Preferably, an image displayed by said interface means 3 comprises a plurality of sensitive zones, thereby making it possible to choose from among a plurality of possible different alternatives, presented respectively by said sensitive zones. In this case, the sum of the areas of all of said sensitive zones is preferably less than a predetermined percentage, for example 5%, of the total area of said image displayed.

The smaller is said predetermined percentage, the smaller is the probability that an erroneous value of the cursor's position received by the means 11, 12 of avionics type corresponds to a sensitive zone other than that selected by the operator.

Furthermore, when said device 2 receives the co-ordinates of a first sensitive zone of the image which has been designated and validated with the aid of the means 15, it verifies the consistency of these co-ordinates (with respect to the information initially sent in the form of said image) and, if these co-ordinates are consistent, said device 2 returns (to the interface means 3) a new item of information, the corresponding image of which comprises a confirmation sensitive zone that must be designated and validated by an operator (by way of said means 15) in order to confirm the initial designation and initial validation of said first sensitive zone.

In this case, preferably, said confirmation sensitive zone is provided alongside said first initially designated and validated sensitive zone.

This allows the operator to intuitively and ergonomically verify that the information received by said means 11, 12 of avionics type does indeed correspond to his (initial) action on the means 15, before confirming his choice if necessary.

Furthermore, in a second (preferred) embodiment represented in FIG. 2, said device 2 forms part of a network R1 of devices 2 of avionics type and said interface means 3 forms part of a network R2 of interface means 3.

The various interface means 3 of said network R2 are similar to the interface means 3 described previously, in relation to FIG. 1. These various interface means 3 are connected directly (by links e2) to an information transmission link L2 of said network R2.

Likewise, the various devices 2 of the network R1 are connected directly (by links e1) to an information transmission link L1 of said network R1.

These devices 2 of FIG. 2 are similar to the device 2 of FIG. 1, with the exception of the means of avionics type for determining a representation of information in the form of an image. More precisely, said devices 2 of FIG. 2 do not comprise said means 11.

Specifically, in this second embodiment, said means 12 of avionics type which determines a representation of said information in the form of an image, corresponds to an interface module 12 which is provided between said networks R1 and R2, while being connected by the links 18 and 19 respectively to said links L1 and L2 of said networks R1 and R2. This preferred embodiment has the advantage of centralizing in a single item of equipment (said interface module 12) the function of transforming information into the form of images representing this information, rather than duplicating this function in each of the various devices 2 of avionics type of said network R1.

The information dispatched by a device 2 to an interface means 3, therefore flows:
- in the form of a flagged text, from said device 2 to said interface module 12, via said links e1, L1 and 18, thereby making it possible not to overload the network R1 with images; and
- in the form of an image, from said interface module 12 to said interface means 3, via said links 19, L2 and e2.

In the reverse direction (that is to say from an interface means 3 to a device 2), the system 1 allows in particular the transmission of simple actions carried out by a user on said interface means 3, in particular with the aid of the means 14 and 15.

The invention claimed is:

1. A process for transmitting information on an aircraft, from an avionics-type device to an open-world-type interface component that is available to an operator of the aircraft, the avionics-type device and the open-world-type interface component being able to be connected together, the process comprising:
 (a) determining, with the aid of an avionics-type component, a representation of an item of information to be transmitted in the form of an image, the image being represented by a number of symbols that represent pixels of the image and formed by concatenating elementary images of characters constituting the item of information;

(b) transmitting the image representing the item of information to the open-world-type interface component; and (c) displaying, on a display screen of the open-world-type interface component, the image corresponding to the representation of the item of information.

2. The process of claim 1, wherein the avionics-type component forms part of the avionics-type device.

3. The process of claim 1, wherein:
the avionics-type device forms part of a first network of avionics-type devices,
the open-world-type interface component forms part of a second network of open-world-type interface components, and
the avionics-type component is an interface module provided between the first and second networks.

4. The process of claim 1, wherein an operator can request the retransmission of information with the aid of the open-world-type interface component.

5. The process of claim 1, further comprising transmitting an indication from the open-world-type interface component to the avionics-type device.

6. The process of claim 1, wherein:
an image displayed by the open-world-type interface component comprises a sensitive zone that can be designated and validated by an operator with the aid of a designation and validation component, and
when the sensitive zone is designated and validated, the open-world-type interface component transmits to the avionics-type device the coordinates of the sensitive zone.

7. The process of claim 6, wherein:
an image displayed by the open-world-type interface component comprises a plurality of sensitive zones, and
the sum of the areas of all of the sensitive zones is less than a predetermined percentage of the total area of the image comprising the plurality of sensitive zones.

8. The process of claim 6, wherein:
when the avionics-type device receives the coordinates of a first sensitive zone which has been designated and validated, it verifies the consistency of these coordinates, and
if the coordinates of the first sensitive zone are consistent, the avionics-type device transmits to the open-world-type interface component an image, representing a new item of information, that comprises a confirmation sensitive zone that must be designated and validated by an operator so as to confirm the designation and validation of the first sensitive zone.

9. The process of claim 8, wherein the confirmation sensitive zone is displayed alongside the first sensitive zone.

10. An information transmission system carried on board an aircraft, the system comprising:

an avionics-type device;
an open-world-type interface component that is available to an operator;
an information transmission component that is capable of connecting together the avionics-type device and the open-world-type interface component; and
an avionics-type component that determines a representation of an item of information to be transmitted in the form of an image from the avionics-type device to the open-world-type interface component and transmits the image to the open-world-type interface component, wherein:
the image is represented by a number of symbols that represent pixels of the image and formed by concatenating elementary images of characters constituting the item of information, and
the open-world-type interface component comprises a display screen that displays the image representing the item of information.

11. The system of claim 10, wherein the avionics-type component forms part of the avionics-type device.

12. The system of claim 10, further comprising:
a plurality of avionics-type devices that form a first network and are connected directly to a first information transmission link of the first network; and
a plurality of open-world-type interface components that form a second network and are connected directly to a second information transmission link of the second network, wherein:
the avionics-type component is connected to the first and second information transmission links such that information transmitted by an avionics-type device to an open-world-type interface component flows in the form of flagged text, from the avionics-type device to the avionics-type component, and in the form of an image from the avionics-type component to the open-world-type interface component.

13. The system of claim 10, wherein the open-world-type interface component transmits and indication to the avionics-type device.

14. The system of claim 10, wherein the open-world-type interface component comprises a cursor control device that is actuated by an operator and comprises:
a designation component that moves a cursor over an image displayed on the display screen in such a way as to designate a sensitive zone of the image by depicting a marker; and
a validation component that validates the sensitive zone designated by the marker.

* * * * *